US011237407B2

(12) United States Patent
Head

(10) Patent No.: US 11,237,407 B2
(45) Date of Patent: Feb. 1, 2022

(54) MAGNETIC EYEWEAR RETAINER SYSTEM AND METHOD

(71) Applicant: Jason Head, Cornelia, GA (US)

(72) Inventor: Jason Head, Cornelia, GA (US)

( * ) Notice: Subject to any disclaimer, the term of this patent is extended or adjusted under 35 U.S.C. 154(b) by 0 days.

(21) Appl. No.: 16/025,924

(22) Filed: Jul. 2, 2018

(65) Prior Publication Data

US 2020/0004043 A1 Jan. 2, 2020

(51) Int. Cl.
*G02C 3/00* (2006.01)
*G02C 5/14* (2006.01)

(52) U.S. Cl.
CPC .......... *G02C 3/006* (2013.01); *G02C 5/143* (2013.01); *G02C 2200/02* (2013.01)

(58) Field of Classification Search
CPC ..... G02C 2200/02; G02C 3/006; G02C 3/003
USPC .................................................. 351/156, 157
See application file for complete search history.

(56) References Cited

U.S. PATENT DOCUMENTS 7,229,171 B2 * 6/2007 Dietz ...................... G02C 3/04
24/3.3

* cited by examiner

*Primary Examiner* — Hung X Dang
(74) *Attorney, Agent, or Firm* — Charlena Thorpe, Esq.; Incorporating Innovation LLC

(57) ABSTRACT

Implementations of a magnetic eyewear retainer system and method are provided. In some implementations, the magnetic eyewear retainer system comprises eyewear temple magnets and a retainer necklace. In some implementations, the magnetic eyewear retainer system further comprises eyewear that includes the eyewear temple magnets. In some implementations, the magnetic eyewear retainer method comprises attaching the eyewear temple magnets to the temples of eyewear and magnetically connecting the eyewear to the retainer necklace with the eyewear temple magnets to retain the eyewear on a user's person while the eyewear is not being worn on the user's face.

8 Claims, 12 Drawing Sheets

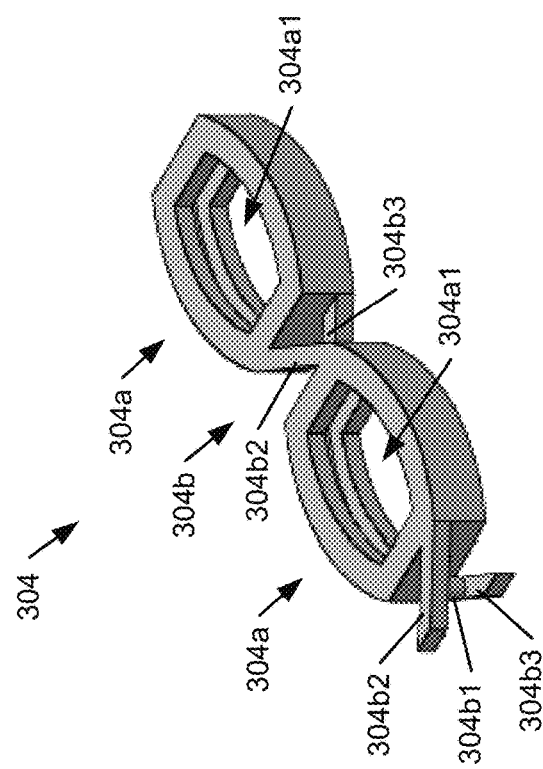
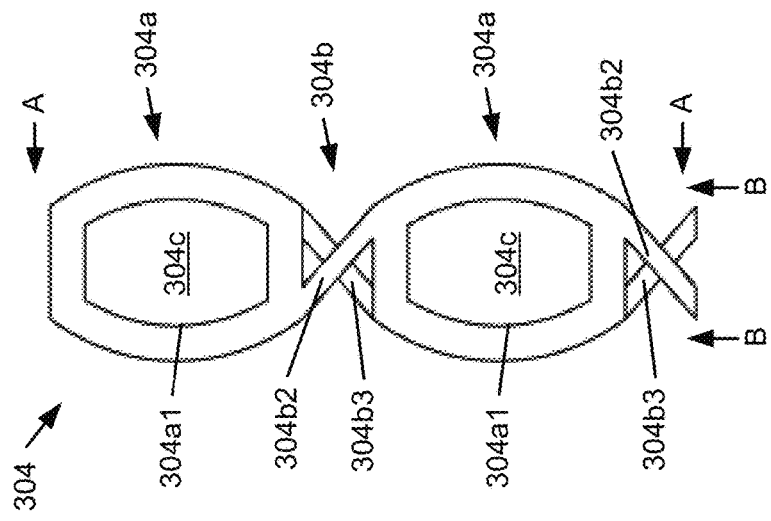
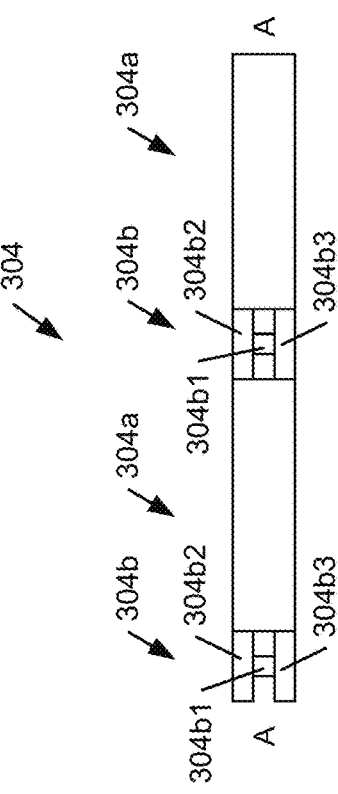
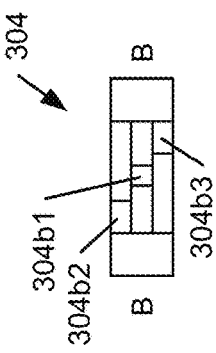

MAGNETIC EYEWEAR RETAINER SYSTEM AND METHOD

TECHNICAL FIELD

This disclosure relates to implementations of a magnetic eyewear retainer system and method.

BACKGROUND

FIG. 1 illustrates eyeglasses and other eyewear worn on a user's face such as sunglasses and protective glasses (hereinafter referred to collectively or individually as "eyewear"). Eyewear may be worn for various purposes. For example, eyewear, such as eyeglasses (or glasses), may be worn for vision correction or improvement. As another example, eyewear, such as sunglasses, may be worn for sunlight protection and glare reduction. As yet another example, eyewear, such as protective glasses, may be worn for eye protection from dust and debris. A person wearing eyewear may desire wear the eyewear at times and not wear the eyewear at other times yet have the eyewear conveniently accessibly while the eyewear is not in use.

FIGS. 2A-2D illustrates eyewear retainers, such as eyewear chains or cords to hold eyewear on a user when the eyewear is not in use (e.g., when the eyewear is not worn on the user's face). As shown in FIGS. 2C and 2D, existing eyewear retainers are attached to the temples (or "arms") of eyewear and the retainers are worn around a user's neck to conveniently and accessibly retain the eyewear on the user when the eyewear is not being used. However, the retainer can be unsightly and/or uncomfortable. For example, as shown in FIGS. 2A and 2B, when the eyewear is worn on the user's face, the attached retainer chain or cord hangs down from the eyewear arms and along the sides of and/or behind the user's head and around the user's neck. As another example, as shown in FIGS. 2C and 2D, when the eyewear is not worn on the user's face, the attached retainer chain or cord hangs down from around the user's neck.

BRIEF DESCRIPTION OF THE DRAWINGS

FIGS. 5A-5H illustrate various aspects of an implementation of an example retainer necklace of the magnetic eyewear retainer system shown in FIGS. 3A and 3B.

DETAILED DESCRIPTION

Implementations of a magnetic eyewear retainer system and method are provided. In some implementations, the magnetic eyewear retainer system comprises eyewear temple magnets and a retainer necklace. In some implementations, the magnetic eyewear retainer system further comprises eyewear that includes the eyewear temple magnets.

In some implementations, the magnetic eyewear retainer method comprises attaching the eyewear temple magnets to the temples of eyewear and magnetically connecting the eyewear to the retainer necklace with the eyewear temple magnets to retain the eyewear on a user's person while the eyewear is not being worn on the user's face.

In some implementations, the magnetic eyewear retainer system is configured to conveniently and accessibly retain eyewear such as eyeglasses (or glasses), sunglasses, or safety glasses on a user's person from the user's neck while the eyewear is not being worn on the user's face. In some implementations, the magnetic eyewear retainer system is configured to retain such eyewear in such manner without having a retainer chain or cord attached to the eyewear. In some implementations, the magnetic eyewear retainer system is configured to retain such eyewear in such manner without noticeably changing the appearance of the eyewear. In this way, in some implementations, the magnetic eyewear retainer system retains such eyewear in such manner without an unsightly and/or uncomfortable retainer such as a chain or cord attached to the eyewear that hangs from the eyewear temples when the eyewear is being worn and that noticeably changes the appearance of the eyewear in general.

Figure 1:
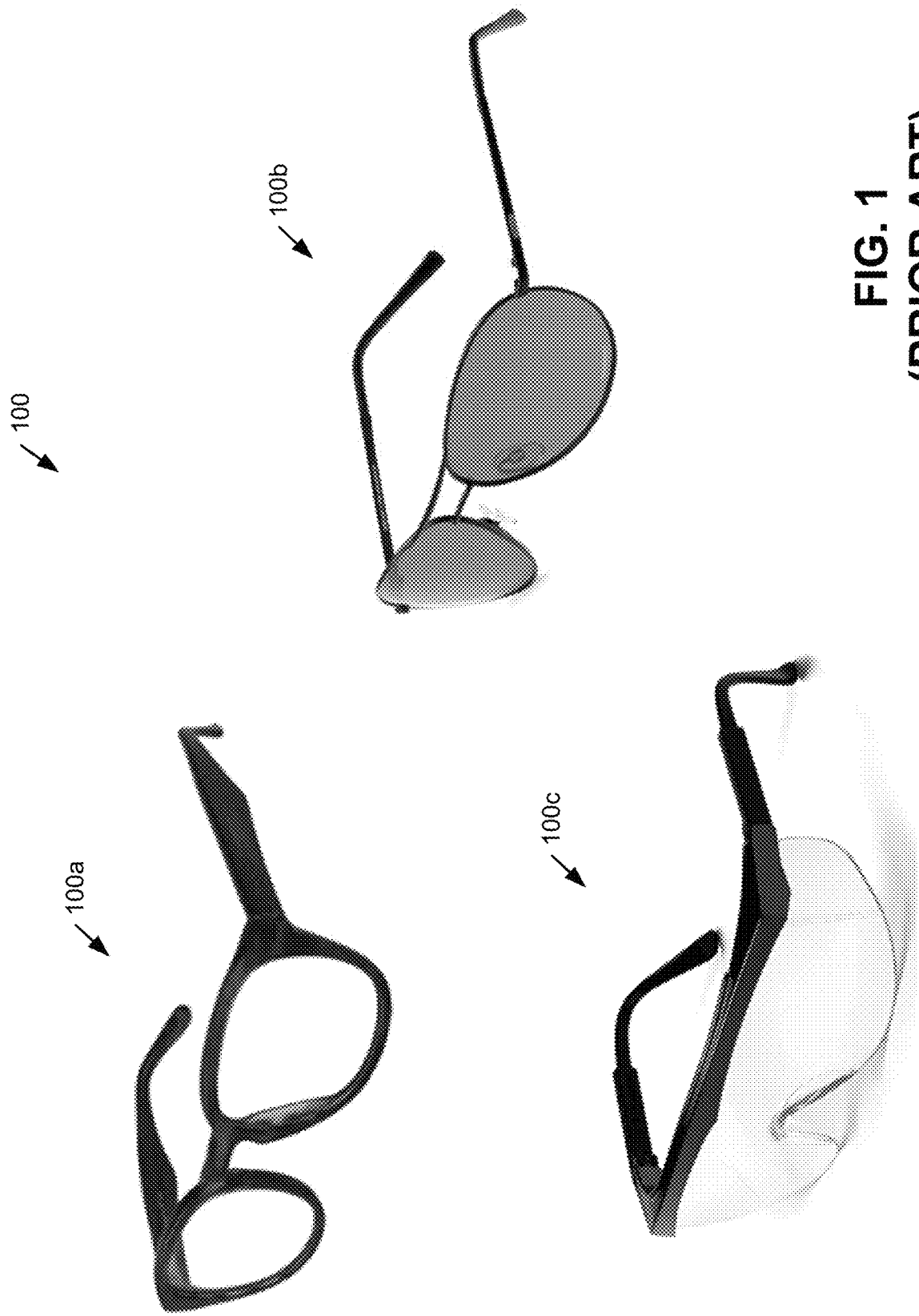
FIG. 1 illustrates examples of existing eyewear such as eyeglasses, sunglasses, and safety or protective glasses.

FIG. 1 illustrates examples of existing eyewear 100 worn on a user's face such as eyeglasses (or glasses) 100a, sunglasses 100b, and safety or protective glasses 100c. Such eyewear 100 is worn on a user's face for various purposes, such as vision correction or improvement provided by the eyeglasses 100a, sunlight protection and glare reduction provided by the sunglasses 100b, and eye protection from dust and debris provided by the safety or protective glasses 100c. Such eyewear 100 is often preferred to be worn at times and not worn at other times while still conveniently and accessibly carried on-person.

Figure 2B:
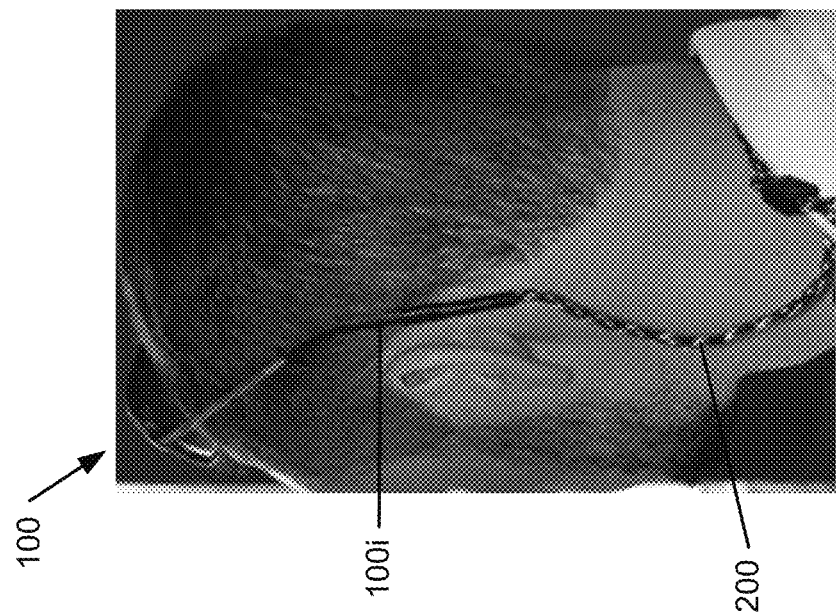
FIGS. 2A-2D illustrate examples of existing eyewear retainers such as eyewear chains or cords.
Figure 2A:
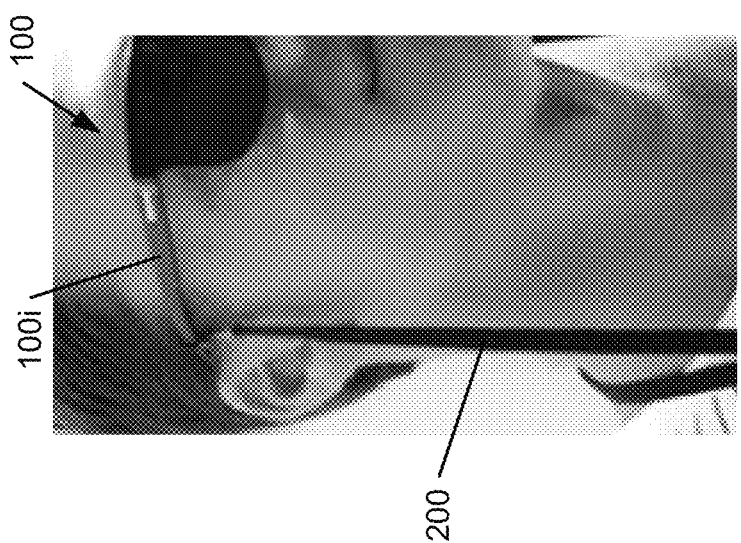
Figure 2D:
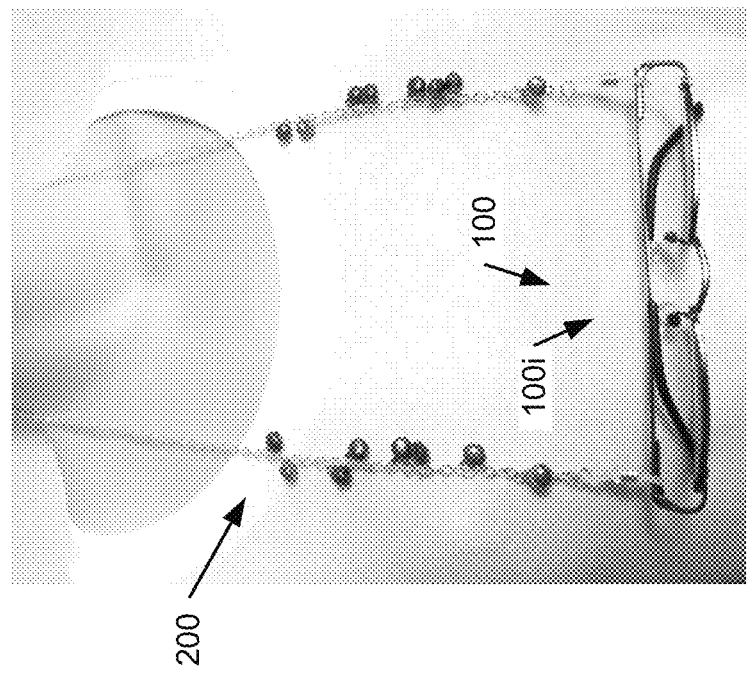
Figure 2C:
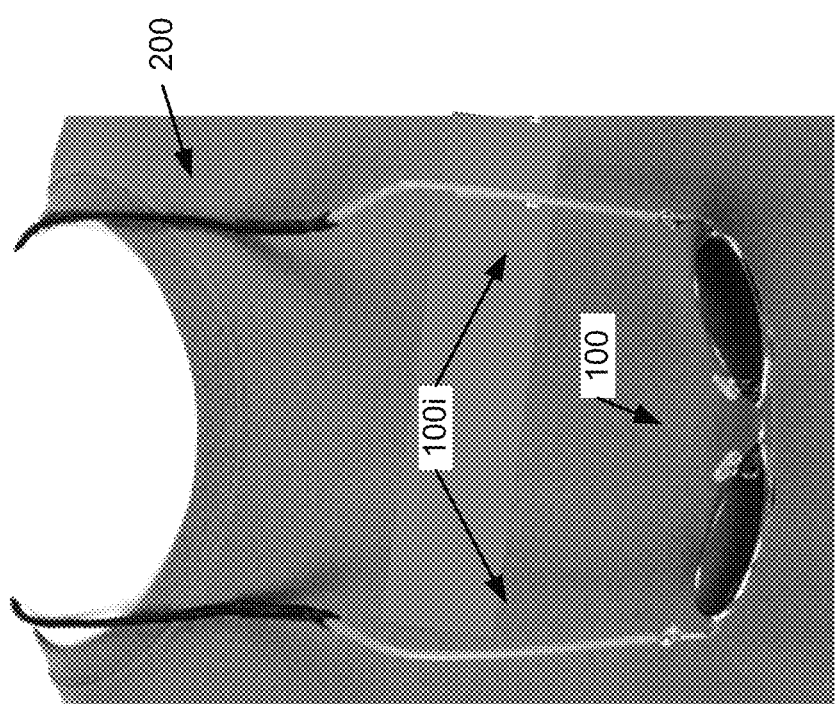

FIGS. 2A-2D illustrate examples of existing eyewear retainers 200 such as eyewear chains or cords. Such eyewear retainers 200 can be attached to the temples (or arms) 100i of eyewear 100 and worn around a user's neck to conveniently and accessibly retain the eyewear on-person. As shown for example in FIGS. 2A and 2B, when the eyewear 100 is worn on a user's face, the attached retainer 200 hangs down from the eyewear temples 100i along the sides of and/or behind the user's head and around the user's neck. As shown for example in FIGS. 2C and 2D, when the eyewear is not worn on the user's face, the attached retainer 200 hangs down from around the user's neck and retains the eyewear 100 in front of the user from the attachment of the retainer 200 to the eyewear temples 100i. The retainer 200 can be unsightly and/or uncomfortable, for example as shown in FIGS. 2A and 2B, when the eyewear is worn on the user's face and the attached retainer 200 hangs down from the eyewear temples 100i as shown.

Figure 3A:
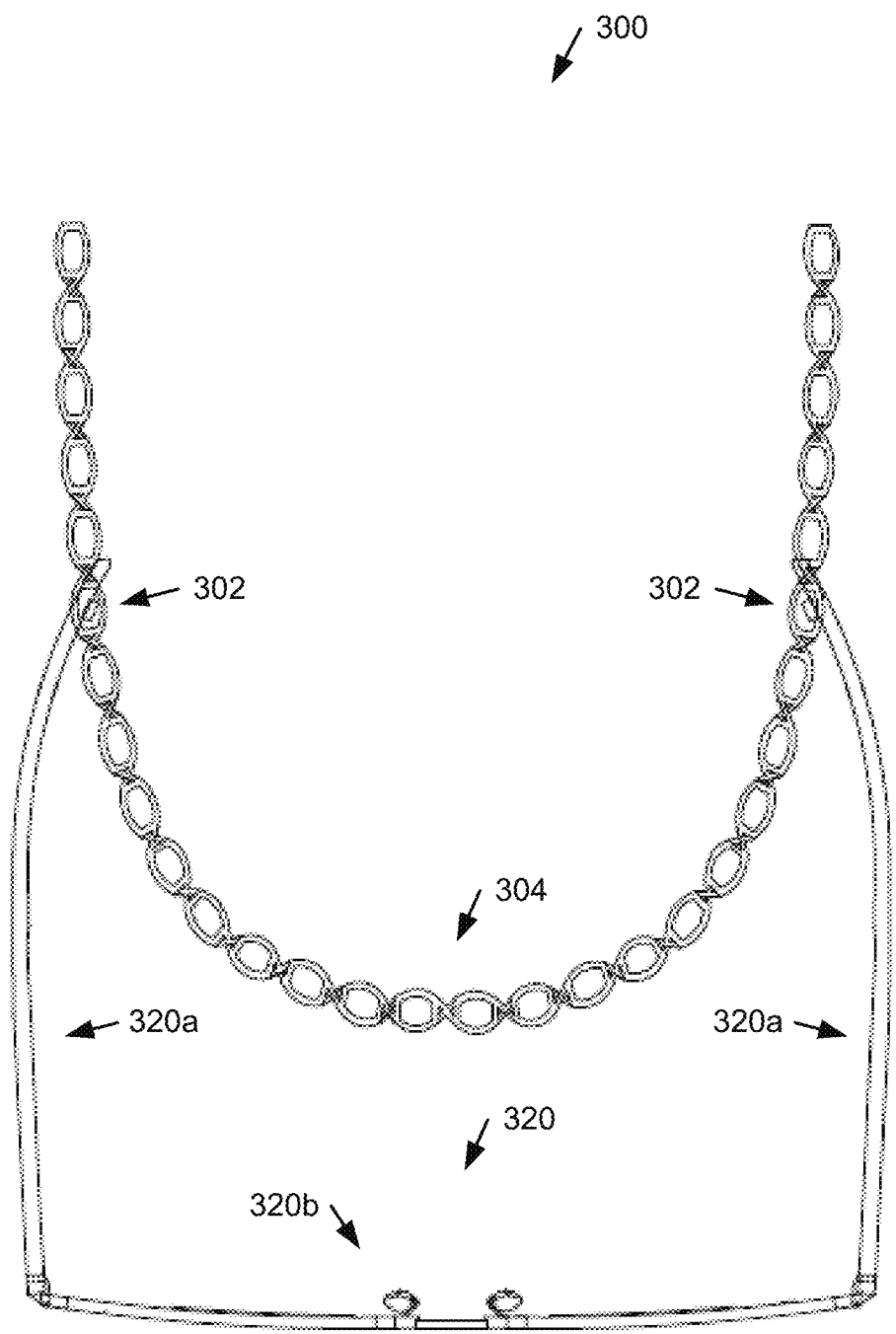
FIGS. 3A and 3B illustrate an implementation of an example magnetic eyewear retainer system according to the present disclosure.
Figure 3B:
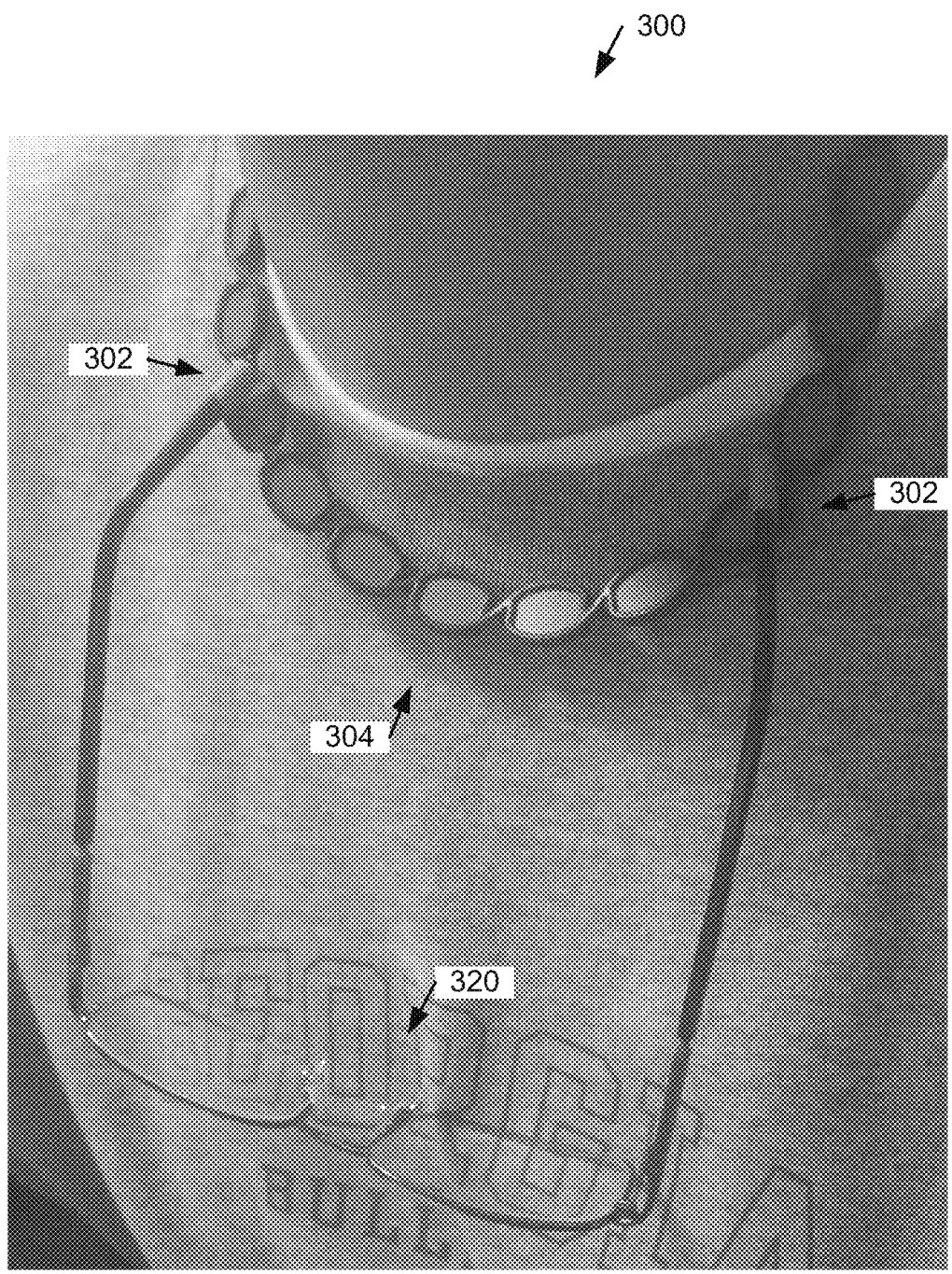

FIGS. 3A and 3B illustrate an implementation of an example magnetic eyewear retainer system 300 according to the present disclosure. In some implementations, the magnetic eyewear retainer system 300 comprises eyewear temple magnets 302 to be used on eyewear 320 and a retainer necklace 304. In some implementations, the magnetic eyewear retainer system 300 comprises eyewear 320 that includes the eyewear temple magnets 302 and a retainer necklace 304. In some implementations, as discussed further below, the eyewear temple magnets 302 comprise a magnet configured to attach to the eyewear 320 and magnetically connect to the retainer necklace 304.

In some implementations, the magnetic eyewear retainer system 300 is configured to conveniently and accessibly retain eyewear 320 such as eyeglasses (or glasses), sunglasses, or safety glasses on a user's person from the user's neck while the eyewear 320 is not being worn on the user's face. In some implementations, the magnetic eyewear retainer system 300 is configured to retain the eyewear 320 in such manner without having a retainer chain or cord attached to the eyewear 320. In some implementations, the magnetic eyewear retainer system 300 is configured to retain the eyewear 320 in such manner without noticeably changing the appearance of the eyewear 320.

Figure 4A:
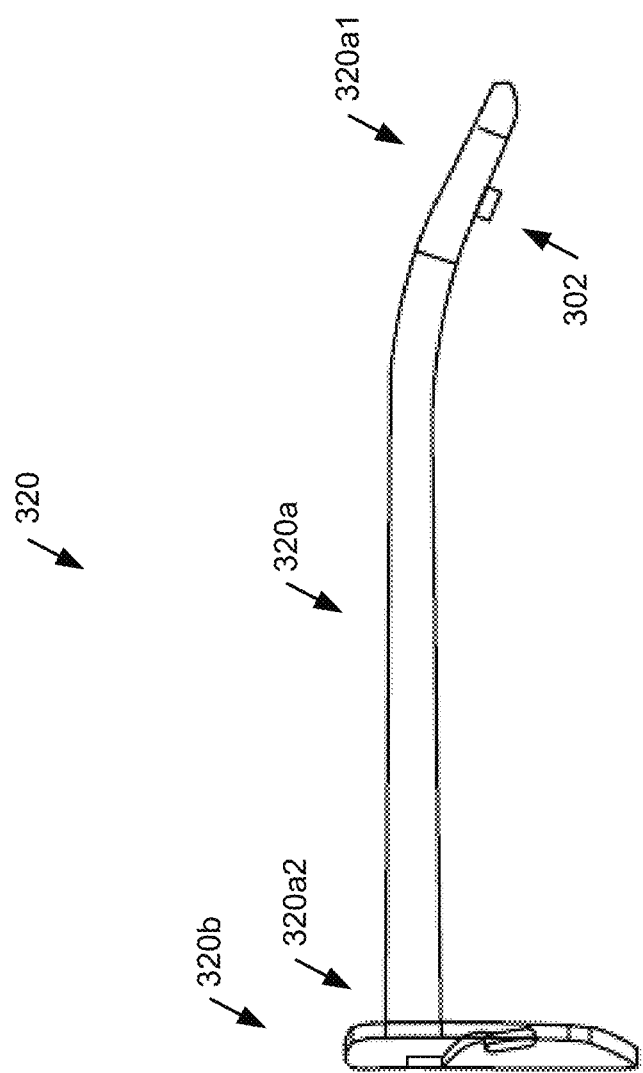
FIG. 4A illustrates an implementations of example eyewear with eyewear temple magnets of the example magnetic eyewear retainer system shown in FIGS. 3A and 3B.

FIG. 4A illustrates a side-view of an example eyewear 320 with eyewear temple magnets 302 of the magnetic eyewear retainer system 300 shown in FIGS. 3A and 3B. In some implementations, as shown in FIGS. 3A and 4A, the eyewear 320 comprises a frame front 320b, temples 320a extending from opposites ends of the frame front 320b, and one or more temple magnets 320.

In some implementations, the eyewear 320 is similar to existing eyewear such as the eyewear 100 described above for FIG. 1 but further comprises the temple magnets 302. In some implementations, the eyewear 320 is eyeglasses, sunglasses, or safety glasses.

In some implementations, the eyewear frame front 320b (which may also be known as a front or a frame) comprises the portion of the eyewear 320 positioned at the front of the user's face when the eyewear is properly worn on the user's face. In some implementations, the eyewear frame front 320b comprises eyepieces (also known as eye wires or rims), a bridge, lenses, and hinges.

In some implementations, each temple 320a (which may also be known as arms) comprises a distal end 320a1 and proximal end 320a2. In some implementations, the proximal end 320a2 of the temple is connected to the frame front 320b of the eyewear 320 and the distal end 320a1 of the temple 320a is opposite from the proximal end 320a2. In some implementations, the temples 320a are configured to support the eyewear on a wearer's face upon the wearer's ears. In some implementations, at least one eyewear temple magnet 302 is attached to at least one temple 320a of the eyewear 320. In some implementations, at least one eyewear temple magnet 302 is attached at the distal end 320a1 or adjacent to or near the end of at least one temple 320a of the eyewear 320. In some implementations, at least one eyewear temple magnet 302 is attached to each temple 320a. In some implementations, a plurality of eyewear temple magnets 302 is attached to each temple 320a. Accordingly, in some implementations, the magnetic eyewear retainer system 300 comprises one or more eyewear temple magnets 302 to be used on eyewear 320.

In some implementations, the temples 320a are a skull type temple. In some implementations, the temples 320a are a library type temple. In some implementations, the temples 320a are any other suitable type of temple.

In some implementations, each of the eyewear temple magnets 302 is configured to attach to a temple 320a of the eyewear 320. In some implementations, each of the eyewear temple magnets 302 is configured to attach to a temple 320a at a distal end 320a1 or adjacent to or near the end of a temple 320a.

Figure 4B:
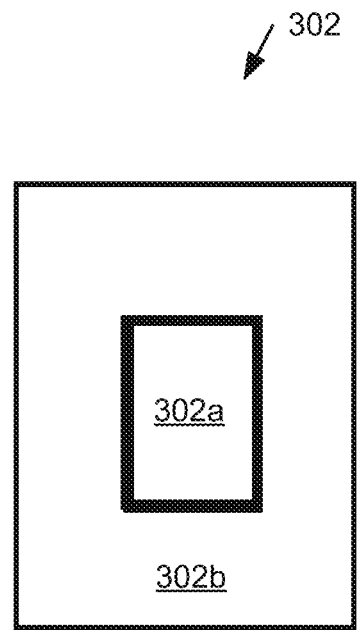
FIG. 4B-4C illustrate an implementation of an example eyewear temple magnet of the magnetic eyewear retainer system shown in FIGS. 3A and 3B.
Figure 4C:
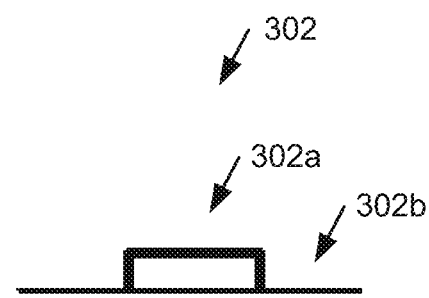

In some implementations, each of the eyewear temple magnets 302 is configured to attach to the temple 320a of the eyewear 320 by an adhesive attachment. FIGS. 4B-4C illustrate an implementation of an example eyewear temple magnet of the magnetic eyewear retainer system shown in FIGS. 3A and 3B. In some implementations, the eyewear temple magnet 302 comprises a magnet 302a attached to adhesive tape 302b where the adhesive tape 302b is configured to wrap around and adhere to a temple 320a.

In some implementations, each of the eyewear temple magnets 302 is configured to attach to the temple 320a of the eyewear 320 by a mechanical attachment. In some implementations, each of the eyewear temple magnets 302 is configured to attach to the temple 320a of the eyewear 320 by any other suitable attachment.

In some implementations, each of the eyewear temple magnets 302 is configured to magnetically connect and hold the eyewear 320 to the retainer necklace 304 using the temple magnets 302. In some implementations, each of the eyewear temple magnets 302 is configured to magnetically connect the eyewear 320 to the retainer necklace 304 at a distal end 320a1 or adjacent to or near the end of a temple 320a. In some implementations, each of the eyewear temple magnets 302 is configured to magnetically connect the eyewear 320 to the retainer necklace 304 when the eyewear temple magnet 302 is attached to a distal end 320a1 or adjacent to or near the end of a temple 320a and the eyewear temple magnet 302 is placed on the retainer necklace 304.

Figure 5A:
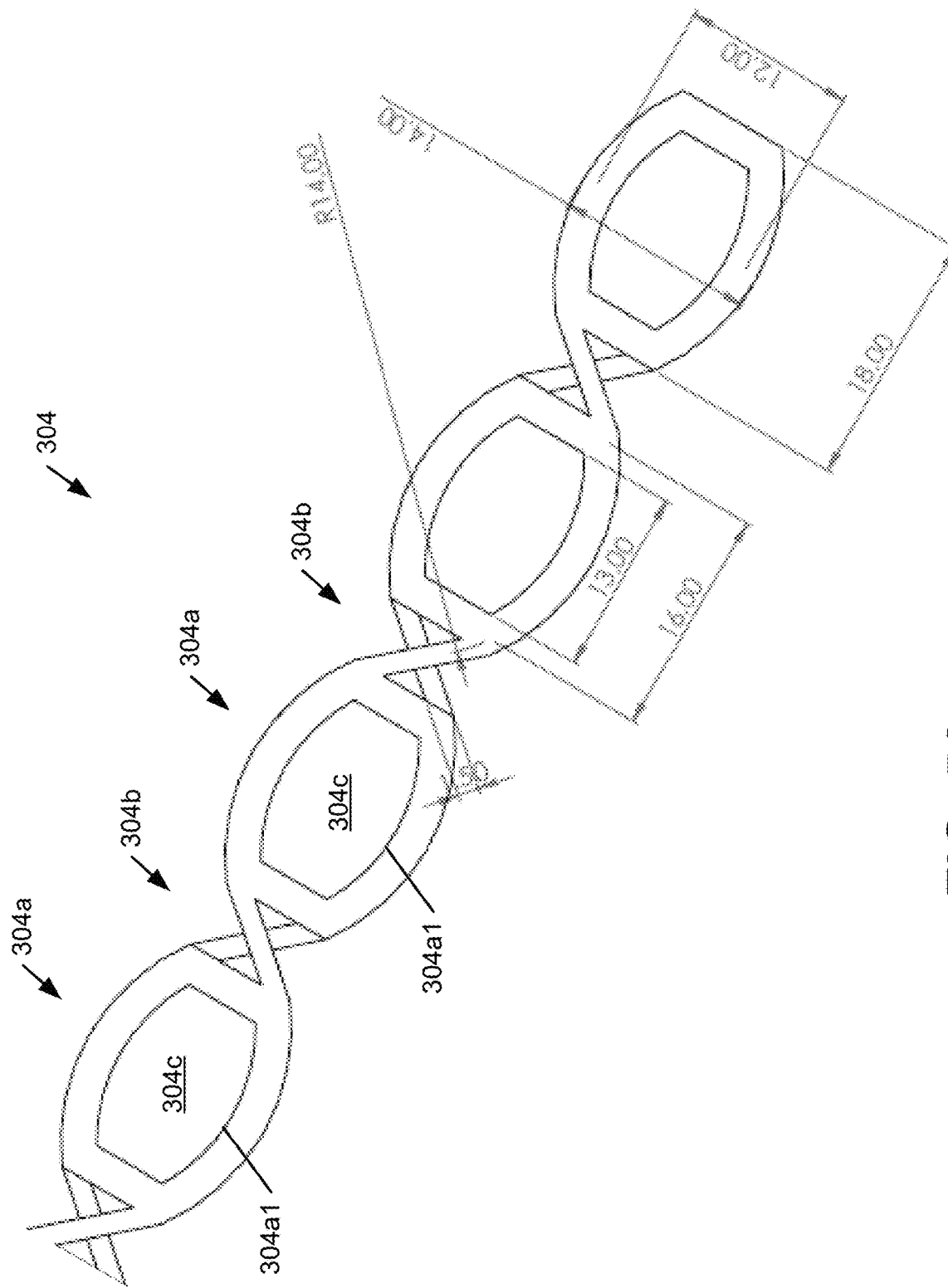
Figure 5F:
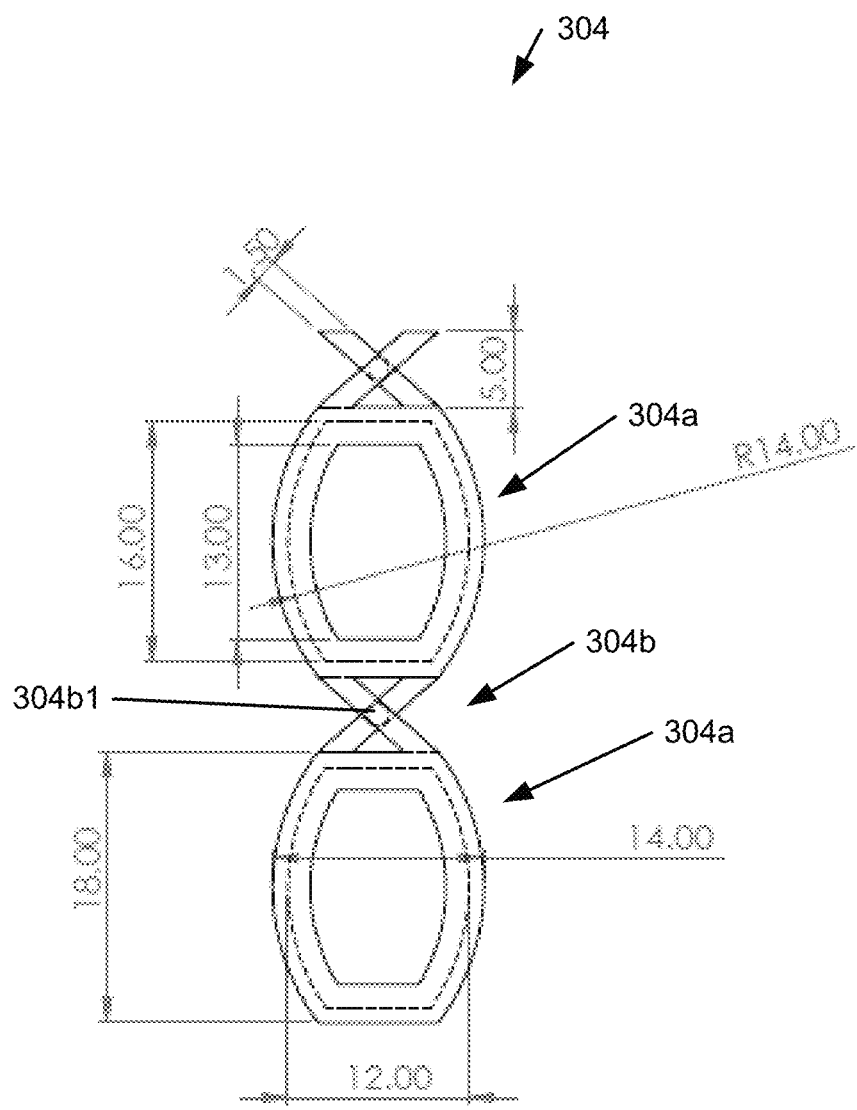
Figure 5G:
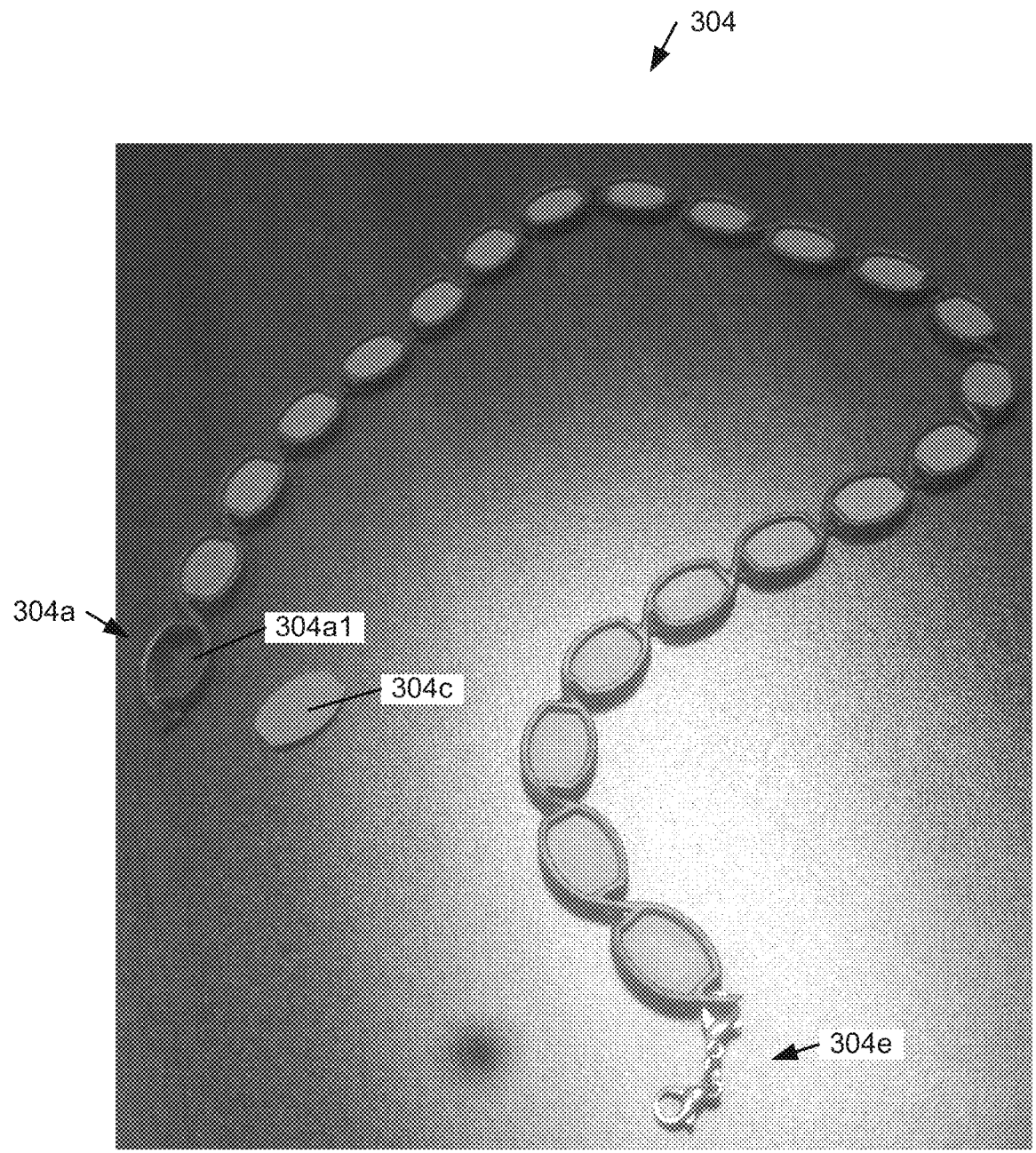
Figure 5H:
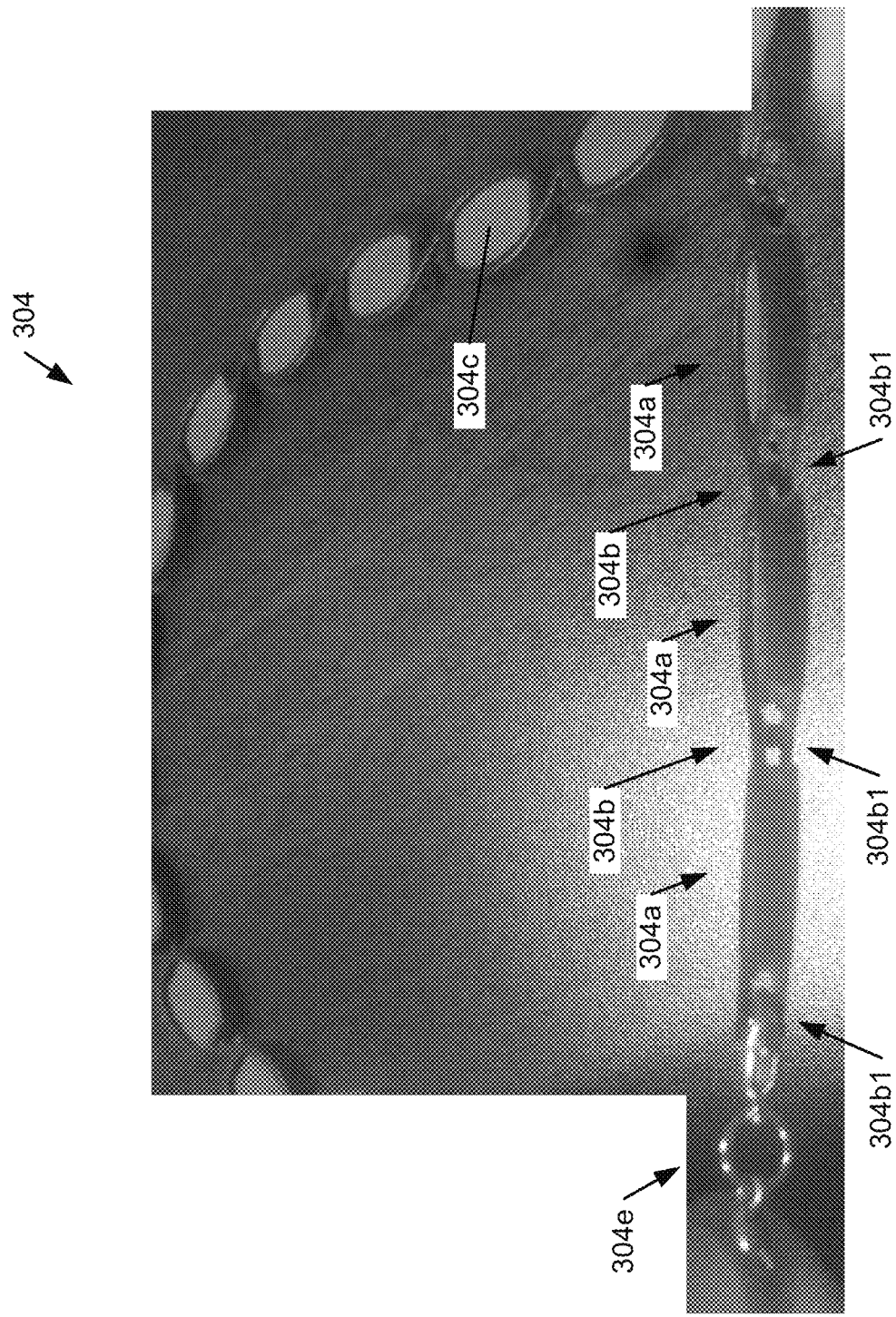

FIGS. 5A-5H illustrate various aspects of an example retainer necklace 304 of the magnetic eyewear retainer system 300 shown in FIGS. 3A and 3B. FIGS. 5A, 5C, and 5F are a top view of the retainer necklace 304. FIGS. 5B, 5G, and 5H are perspective views of the retainer necklace 304. FIGS. 5D and 5E are side views of the retainer necklace 304.

In some implementations, as discussed further below, the retainer necklace 304 comprises a plurality of main links 304a interconnected respectively by a plurality of connecting links 304b, one or more removable inserts 304c held within a frame-like opening 304a1 of one or more of the main links 304a, respectively, and a connecting clasp 304e that connects one end of the necklace 304 to the opposite end.

In some implementations, the retainer necklace 304 is configured to be worn around the neck of a user of the magnetic eyewear retainer system 300. In some implementations, the retainer necklace 304 is of a sufficient length to be placed around the neck of a user.

In some implementations, the retainer necklace 304 is configured to magnetically attract to the eyewear temple magnets 302 to achieve a magnetic attachment. For example, in some implementations, the retainer necklace 304 comprises one or more portions that are ferromagnetic. In some implementations, the retainer necklace 304 comprises one or more portions that include magnets that attract to the eyewear temple magnets 302. In some implementations, one or more portions of the necklace 304 is a magnet and the eyewear temple magnet 302 comprises a ferromagnetic material such as metal. In this way, the eyewear temple magnets 302 may be brought into contact with the retainer necklace 304 to achieve a magnetic attachment. In some implementations, the magnetic attachment is of sufficient strength to hold the eyewear 320 to the necklace 304.

In some implementations, each of the main links 304a may be an oval or semi-oval shape. In some implementations, each of the main links 304a may be any other suitable shape.

In some implementations, one or more of the main links 304a may comprise a frame-like opening 304a1. In some implementations, the frame-like opening 304a1 is configured to hold a removable insert 304c within the opening 304a1. In some implementation, the frame-like opening 304a1 hold the removable insert 304c via a friction fit. In some implementations, the frame-like opening 304a1 includes a channel to hold the removable insert 304c.

In some implementations, one or more of the removable inserts 304c is configured to magnetically attract to the eyewear temple magnets 302. For example, in some implementations, one or more of the inserts 304c is a ferromagnetic material such as metal. In some implementations, one or more of the inserts 304c is a magnet that attract to the eyewear temple magnets 302. In some implementations, one or more of the inserts 304c is a magnet and the eyewear temple magnet 302 comprises a ferromagnetic material such as metal.

In some implementations, the retainer necklace 304 comprises a removable insert 304c held in the opening 304a1 of at least one of the main links 304a. In some implementations, the retainer necklace 304 comprises a removable insert 304c held in the opening 304a1 of a plurality of main links 304a. In some implementations, the retainer necklace 304 comprises a removable insert 304c held in the opening 304a1 of each of the main links 304a of the retainer necklace 304.

In some implementations, the removable inserts 304c are configured to decorate the retainer necklace 304. For example, in some implementations, each of the removable inserts 304c may comprise various appearances such as different colors, designs, or images.

In some implementations, each of the connecting links 304b comprises a first piece 304b2 extending from a first main link 304a to an adjacent main link 304a on a first side of the necklace 304, a second piece 304b3 extending from the first main link 304a to the adjacent main link 304a on a second side of the necklace 304, and a connecting post 304b1 extending from the first piece 304b2 to the second piece 304b3. In some implementations, the first piece 304b2 and the second piece 304b3 form a cross-like shape or cross over each other. In some implementations, the connecting links 304b are configured such that the connecting post 304b1 is configured to be received by the opening of a connecting clasp 304e when at least one end of the first piece 304b2 and second piece 304b3 are cut from one of the main links 304a as shown, for example, in FIGS. 5B, 5G, and 5H.

In some implementations, each of the connecting links 304b may comprise any other suitable shape.

In some implementations, a first end of the connecting clasp 304e is configured to connect to a first connecting link 304b on a first end of the necklace 304 and a second end of the connecting clasp 304e is configured to connect to a second connecting link 304b on a second end, opposite the first end of the necklace 304 to connect the retainer necklace 304 together around the neck of a user of the magnetic eyewear retainer system 300. For example, in some implementations, the connecting clasp 304e comprises a double-ended clasp. In some implementations, the connecting clasp 304e comprises any other suitable type of clasp or other connector.

In some implementations, the magnetic eyewear retainer system 300 comprises any suitable dimensions, such as the dimensions shown in FIGS. 5A and 5F.

In some implementations the connecting links 304b of the retainer necklace 304 are configured to be cut with scissors. In some implementations, the main links 304a and the connecting links 304b of the retainer necklace 304 are composed of a silicone rubber material. In some implementations, the main links 304a and the connecting links 304b are composed of any other suitable materials.

In some implementations, the magnetic eyewear retainer system 300 can have any suitable appearance.

In some implementations, an example method of using the magnetic eyewear retainer system 300 comprises attaching at least one eyewear temple magnet 302 to at least one temple 320a of the eyewear 320. In some implementations, the at least one eyewear temple magnet 302 is attached to a distal end 320a1 or adjacent to or near the end of the at least one temple 320a of the eyewear 320.

In some implementations, the eyewear temple magnet 302 is attached to the temple 320a in a position and/or orientation that is based on the preference of the user of the magnetic eyewear retainer system 300. For example, in some implementations, the eyewear temple magnet 302 is attached to the temple 320a in a position and/or orientation that is based on the comfort and/or appearance preference of the user.

In some implementations, the method comprises magnetically connecting the eyewear 320 to the retainer necklace 304 by bringing the temple magnet into contact with the retainer necklace 304. In some implementations, the method comprises magnetically connecting the eyewear 320 to the retainer necklace 304 to retain the eyewear 320 when the eyewear 320 is not being worn by the user.

In some implementations, the method further comprises cutting at least one end of the connecting links 304b to expose the to remove at least one of the main links 304a from the retainer necklace 304.

In some implementations, the method further comprises removing at least a first insert 304c held in the opening 304a1 of one of the main links 304a and inserting a second insert 304a1 in the opening 304a1. In some implementations, the first insert and second insert have different appearances.

The figures, including photographs and drawings, comprised herewith may represent one or more implementations of the magnetic eyewear retainer system and method.

Details shown in the figures, such as dimensions, descriptions, etc., are exemplary, and there may be implementations of other suitable details according to the present disclosure.

Reference throughout this specification to "an embodiment" or "implementation" or words of similar import means that a particular described feature, structure, or characteristic is comprised in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations may be depicted in the drawings in a particular order, this should not be understood as requiring that such operations be performed in the particular order shown or in sequential order, or that all illustrated operations be performed, to achieve desirable results.

The invention claimed is:

1. A magnetic eyewear retainer system comprising:
a plurality of eyewear temple magnets configured to attach to a temple of eyewear; and a retainer necklace having a first end and a second end that are configured to attach such that when the retainer necklace is worn by a wearer, the necklace completely encircles the wearer's neck and cannot fall off wherein ferromagnetic material is inserted in a plurality of locations along the length of the retainer necklace between the first end and the second end of the retainer necklace such that the temple magnets can connect magnetically to the retainer necklace in a plurality of locations along the retainer necklace away from the ends of the retainer necklace.

2. The magnetic eyewear retainer system of claim 1 further comprise eyewear having a first temple and second temple, wherein at least of the eyewear temple magnets is attached to at least one of the first temple and second temple.

3. The magnetic eyewear retainer system of claim 1 wherein each of the eyewear temple magnets comprises a magnet attached to adhesive tape where the adhesive tape is configured to wrap around and adhere to the temple of eyewear.

4. The magnetic eyewear retainer system of claim 1 wherein the retainer necklace comprises a plurality of main links and one or more inserts removably held within a frame-like opening of one or more of the main links, respectively, wherein one or more of the removable inserts is configured to magnetically attract to the eyewear temple magnets.

5. The magnetic eyewear retainer system of claim 4 wherein the plurality of main links are interconnected respectively by a plurality of connecting links, wherein each of the connecting links comprises a first piece extending from a first main link to an adjacent main link on a first side of the necklace, a second piece extending from the first main link to the adjacent main link on a second side of the necklace, and a connecting post extending from the first piece to the second piece.

6. A method of using the magnetic eyewear retainer system of claim 5, the method comprising cutting at least one of the connecting links to expose the respective connecting post to attach a connecting clasp.

7. The method of claim of using the magnetic eyewear retainer system of claim 4, the method comprising removing at least a first insert held in the opening of one of the main links and inserting a second insert in the opening wherein the first insert and second insert have different appearances.

8. A method of using the magnetic eyewear retainer system of claim 1, the method comprising:
  attaching at least one eyewear temple magnet to at least one temple of eyewear;
  placing the retainer necklace on a wearer's neck and attaching the first end of the retainer necklace to the second end of the retainer necklace such that the retainer necklace completely encircles the wearer's neck; and
  magnetically connecting the eyewear to the retainer necklace away from the ends of the retainer necklace bringing the eyewear temple magnet into contact with the retainer necklace.

* * * * *